(12) United States Patent
Yu

(10) Patent No.: US 7,909,074 B2
(45) Date of Patent: Mar. 22, 2011

(54) FLOOR ENGAGING DEVICE FOR WORKBENCH

(76) Inventor: Ben Yu, Taichung (TW)

( * ) Notice: Subject to any disclaimer, the term of this patent is extended or adjusted under 35 U.S.C. 154(b) by 268 days.

(21) Appl. No.: 12/072,624

(22) Filed: Feb. 27, 2008

(65) Prior Publication Data

US 2009/0212479 A1    Aug. 27, 2009

(51) Int. Cl.
*B25H 1/02* (2006.01)
*B25H 1/16* (2006.01)

(52) U.S. Cl. ............... 144/286.5; 144/287; 414/495; 108/54.1; 108/147; 312/249.8

(58) Field of Classification Search ............ 144/129, 144/285, 286.1, 286.5, 287; 414/462, 467, 414/495; 108/54.1, 144.11, 147, 147.19; 312/351.1, 351.11, 249.8; 269/289 R
See application file for complete search history.

(56) References Cited

U.S. PATENT DOCUMENTS

| 2,599,107 | A | * | 6/1952 | Hebestreit | 144/36 |
| 4,068,550 | A | | 1/1978 | Gray et al. | 83/471.2 |
| 4,159,821 | A | | 7/1979 | Hickman | 269/139 |
| 4,161,974 | A | | 7/1979 | Patterson | 144/287 |
| 5,988,239 | A | * | 11/1999 | Chen | 144/129 |
| 6,802,441 | B1 | * | 10/2004 | DuRant et al. | 224/513 |
| 2006/0201301 | A1 | * | 9/2006 | Schwaiger et al. | 83/477.1 |

* cited by examiner

*Primary Examiner* — Shelley Self
(74) *Attorney, Agent, or Firm* — Raymond Y. Chan; David and Raymond Patent Firm

(57) ABSTRACT

A workbench includes a wheel device secured to a work table, four floor engaging extremities attached to the work table, four rotary members rotatably attached to the work table and engaged with the floor engaging extremities respectively for adjusting the work table up and down relative to the floor engaging extremities, and a coupling device for coupling the rotary members together and for allowing the rotary members to be rotated relative to the floor engaging extremities simultaneously and thus for allowing the work table to be adjusted up and down relative to the floor engaging extremities simultaneously. A hand wheel may be coupled to the coupling device for operating the coupling device.

11 Claims, 9 Drawing Sheets

FLOOR ENGAGING DEVICE FOR WORKBENCH

BACKGROUND OF THE INVENTION

1. Field of the Invention

The present invention relates to a workbench, and more particularly to a movable workbench including a floor engaging device that may be easily and quickly adjusted or operated by the users for actuating or operating the wheels simultaneously and for quickly elevating and disengaging or separating the wheels from the ground or the supporting surface.

2. Description of the Prior Art

Typical workbenches, circular saws, table saws, or other power machines or machine tools comprise a work table for supporting the circular saws, the table saws, or other power tools that are provided for working or machining the work pieces.

For example, U.S. Pat. No. 4,068,550 to Gray et al. discloses one of the typical foldable benches for a portable hand-held circular saw comprising four floor engaging extremities attached to the four corners of the work table for engaging with the ground or the supporting surface and for adjustably supporting the work table in a level or horizontal status.

However, no rollers or wheels may be provided for moving the work tables of the typical foldable benches which carry or support the heavy circular saws, the table saws, or the heavy power tools such that additional elevating and moving facilities are required to be prepared and operated to elevate and disengage or separate the work table of the typical foldable benches from the ground or the supporting surface and then to move the work table of the typical foldable benches. In addition, it is time consuming to rotate the four floor engaging extremities.

U.S. Pat. No. 4,159,821 to Hickman discloses another typical collapsible dual-height workbench also comprising four adjustable feet attached to the four corners of the workbench and each having a rubber foot for engaging with the ground or the supporting surface and for adjustably supporting the workbench in a level or horizontal status.

However, similarly, no rollers or wheels may be provided for moving the typical workbench such that additional elevating and moving facilities are also required to be prepared and operated to elevate and disengage or separate the typical workbench from the ground or the supporting surface and then to move the work table of the typical workbench. In addition, it is time consuming to rotate the four floor engaging extremities.

U.S. Pat. No. 4,161,974 to Patterson discloses a further typical power tool comprising two pairs of foldable legs for engaging with the ground or the supporting surface, and an additional leg is further provided and having an adjustable swivel glide for adjusting and leveling the typical power tool.

However, similarly, no rollers or wheels may be provided for moving the typical power tool such that additional elevating and moving facilities are also required to be prepared and operated to move the typical power tool.

The present invention has arisen to mitigate and/or obviate the afore-described disadvantages of the conventional power machines or workbenches.

SUMMARY OF THE INVENTION

The primary objective of the present invention is to provide a workbench including a floor engaging device that may be easily and quickly adjusted or operated by the users for actuating or operating the wheels simultaneously and for quickly elevating and disengaging or separating the wheels from the ground or the supporting surface.

In accordance with one aspect of the invention, there is provided a workbench comprising a work table, a wheel device secured to a bottom of the work table for allowing the work table to be moved everywhere with the wheel device, four floor engaging extremities attached to the bottom of the work table, four rotary members rotatably attached to the bottom of the work table and engaged with the floor engaging extremities respectively for adjusting the work table up and down relative to the floor engaging extremities, and a coupling device for coupling the rotary members together and for allowing the rotary members to be rotated simultaneously and for adjusting the work table up and down relative to the floor engaging extremities simultaneously and thus for allowing the floor engaging extremities to be easily and quickly adjusted or operated by the users and thus for allowing the work table to be evenly moved or adjusted up and down relative to the floor engaging extremities.

A base support is further provided disposed below the work table and for supporting the work table. The rotary members are rotatably attached to the base support, and the floor engaging extremities and the wheel device are attached or secured to the base support. The wheel device includes one or more plates secured to the base support, a bracket rotatably attached to each of the plates with a pivot pin, and a wheel member rotatably attached to each of the brackets.

Four tubular members are rotatably attached to the base support and secured to the rotary members respectively, and the floor engaging extremities each include a threaded member threaded and engaged with the tubular members respectively for allowing the tubular members to be moved and adjusted up and down relative to the threaded members when the tubular members and the rotary members are rotated relative to the threaded members with the coupling device.

The floor engaging extremities each include a shank extended from the threaded member, and a threaded stem threaded and engaged with the shank for selectively adjusting the shank and the threaded member up and down relative to the threaded stem. The floor engaging extremities each include a foot attached to the threaded stem.

The floor engaging extremities each include a fastener or non-circular element secured to the threaded stem for allowing the threaded stem to be rotated relative to the shank with the non-circular element.

The floor engaging extremities each include a lock nut engaged onto each of the threaded stems for selectively engaging with the shank and for selectively locking the threaded stem to the shank and for preventing the shank from being adjusted up and down relative to the threaded stem.

The floor engaging extremities each include an arm secured to the base support and having a non-circular opening formed in the arm, and the shank include a non-circular outer structure for slidably engaging with the non-circular opening of the arm and for allowing the shank to be slidably moved up and down relative to the arm.

The floor engaging extremities each include a socket secured to the rotary member and having a non-circular bore formed therein for slidably engaging with the shank and for preventing the shank from being rotated and adjusted relative to the threaded stem inadvertently.

The coupling device includes a coupling member engaged with the rotary members for coupling the rotary members together and for rotating the rotary members simultaneously and for adjusting the work table up and down relative to the floor engaging extremities simultaneously.

An operating device is further provided for operating the coupling member to rotate the rotary members simultaneously. The operating device includes a second rotary member engaged with the coupling member, and a hand wheel coupled to the second rotary member for actuating the second rotary member to rotate the coupling member and the rotary members and for being operated manually by the users.

The operating device includes a pivot axle secured to the second rotary member, a first coupler secured to the pivot axle, and a shaft rotatably attached to the work table and secured to the hand wheel, and a second coupler secured to the shaft and engaged with the first coupler for allowing the second rotary member to be operated with the hand wheel. A further rotary member may further be provided and engaged with the coupling member for tensioning the coupling member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
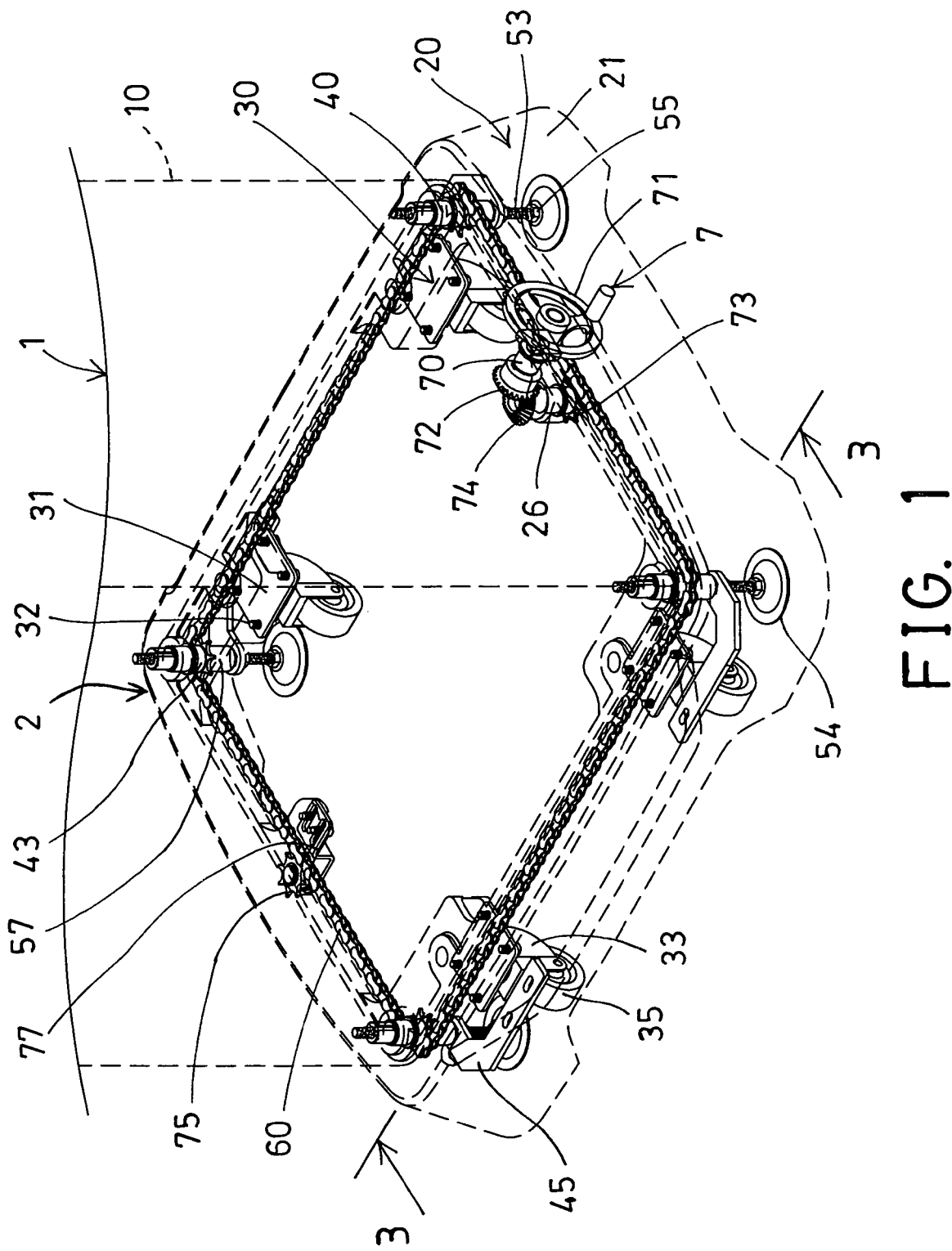
FIG. 1 is a partial perspective view illustrating a floor engaging device for a workbench in accordance with the present invention.
Figure 2:
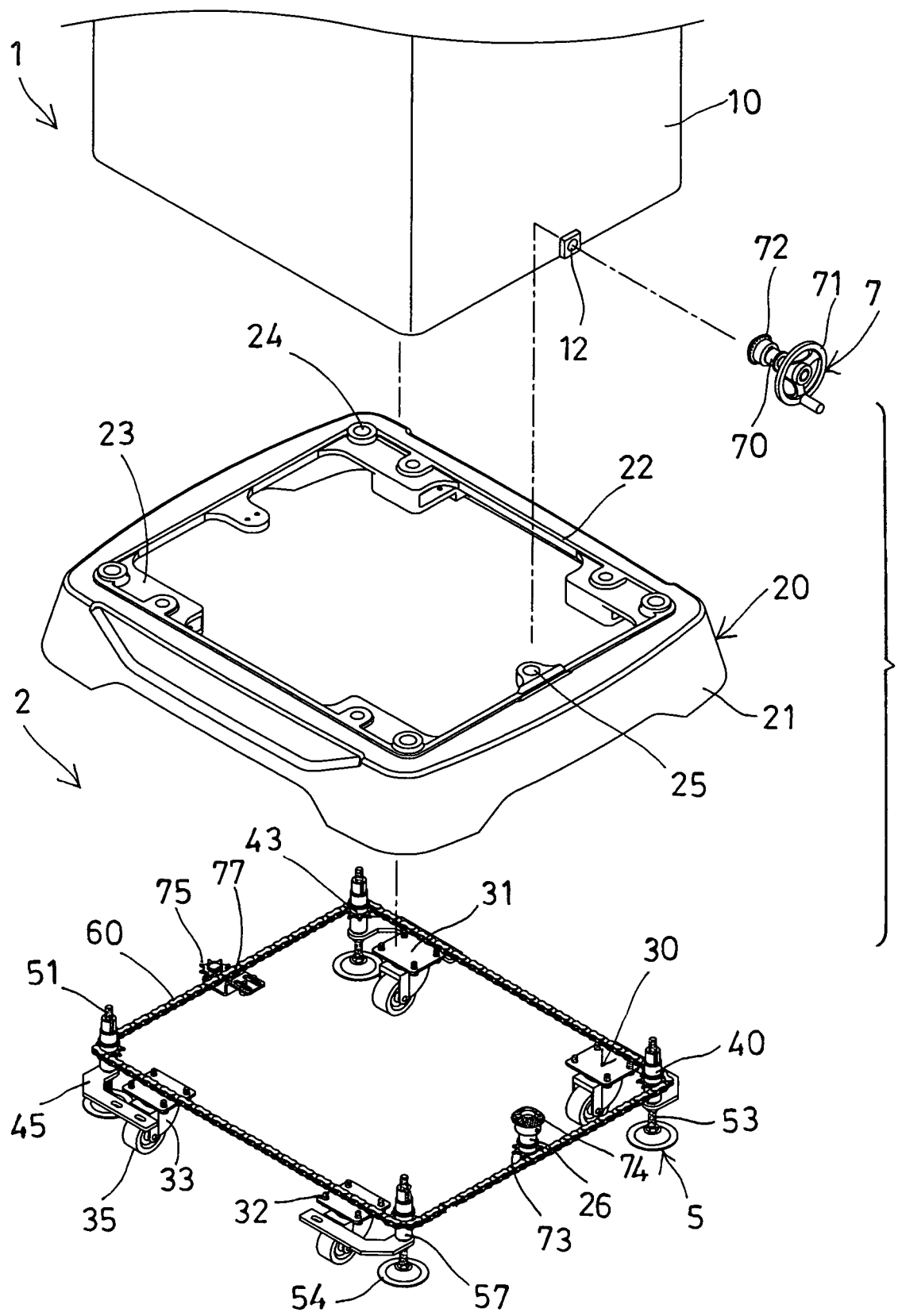
FIG. 2 is a partial exploded view the floor engaging device for the workbench.
Figure 3:
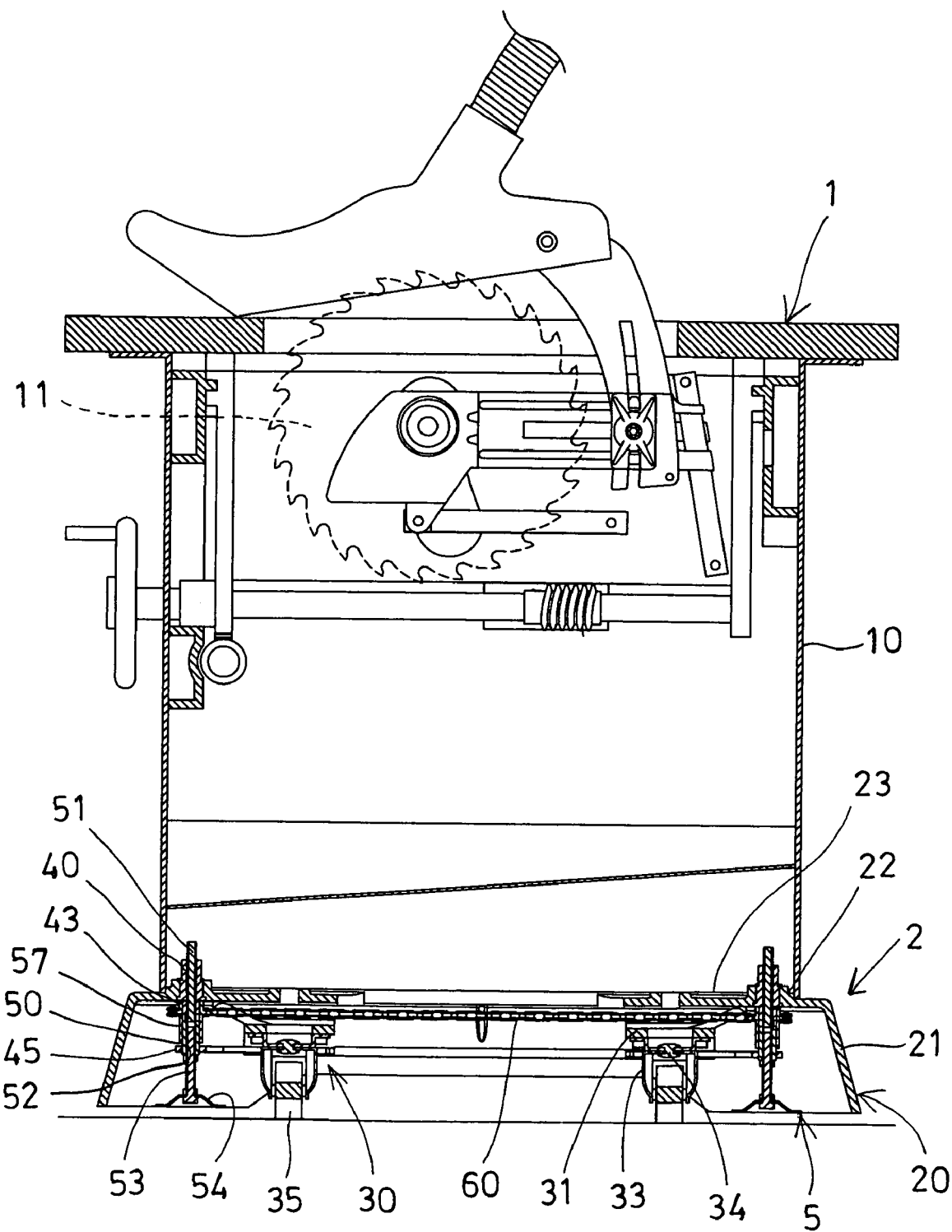
FIG. 3 is a partial cross sectional view of the workbench taken along lines 3-3 of FIG. 1.

Referring to the drawings, and initially to FIGS. 1-3, a workbench 1 in accordance with the present invention comprises a work table 10 for supporting a circular saw or table saw 11, or other power tools (not shown) that are provided for working or machining the work pieces (not shown), in which the circular saws or table saws 11, or the other power tools are not related to the present invention and will not be described in further details. The workbench 1 in accordance with the present invention further comprises a floor engaging device 2 attached to the bottom of the work table 10 for allowing the work table 10 to be easily moved everywhere and for allowing the work table 10 to be stably or stationary situated or supported on the ground or the supporting surface.

Figure 7:
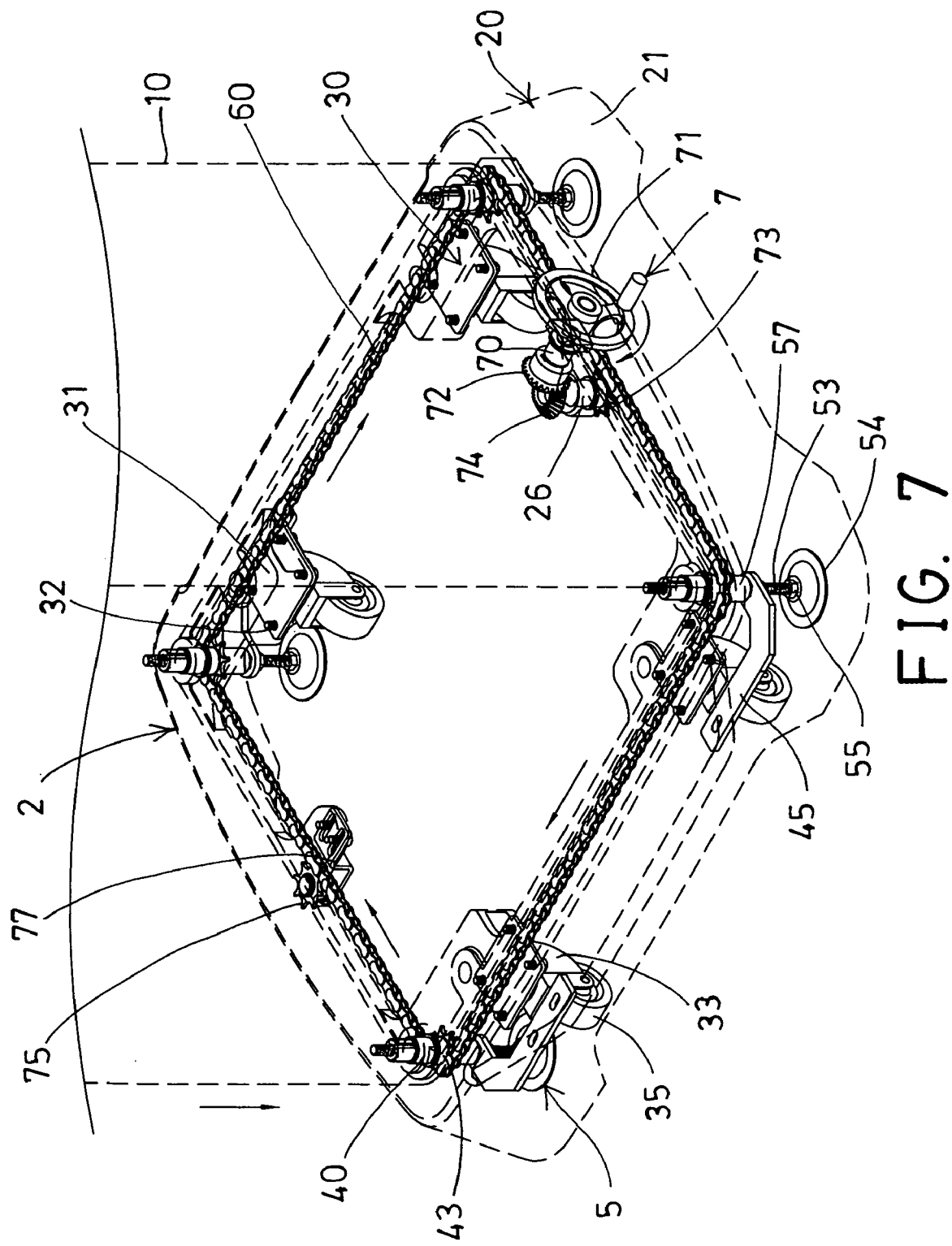
FIG. 7 is a further partial perspective view similar to FIG. 1, illustrating the operation of the workbench.

The floor engaging device 2 optionally includes a base cabinet, stand or support 20 having a rectangular or peripheral frame 21 for being disposed below or on the bottom of the work table 10 and for supporting the heavy work table 10, and having a peripheral flange 22 extended upwardly from the peripheral frame 21 (FIG. 2) for engaging into the bottom of the work table 10 and for stably anchoring and positioning the work table 10 on the peripheral frame 21 and for preventing the work table 10 from moving laterally relative to the peripheral frame 21. The base support 20 includes four corner areas 23 each having an orifice 24 formed therein, and includes an ear or an aperture 25 formed in one of the side portions of the peripheral frame 21 for rotatably attaching or mounting a pivot axle 26 (FIGS. 1, 2, 7).

Figure 4:
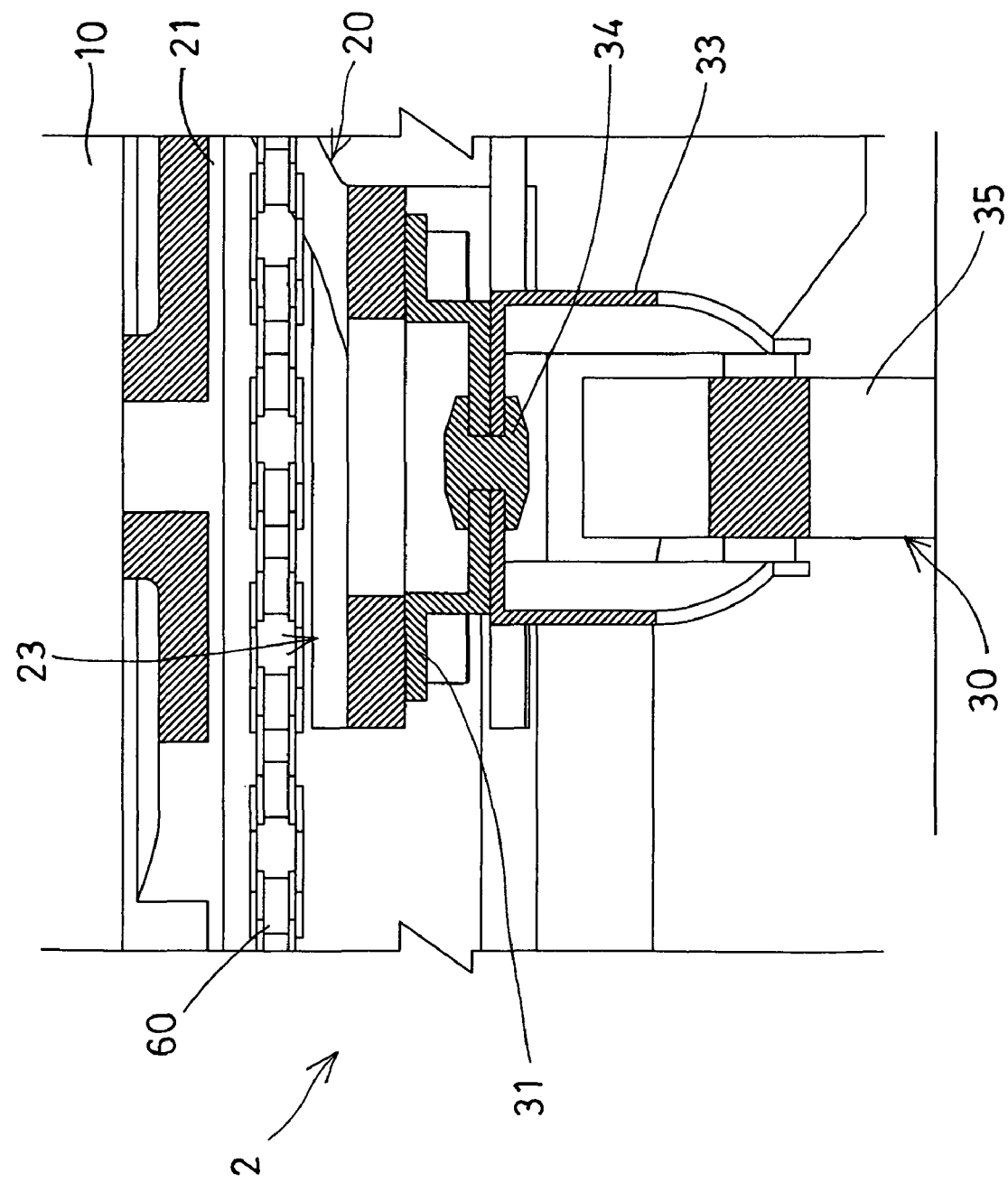
FIG. 4 is an enlarged partial cross sectional view of the workbench.
Figure 5:
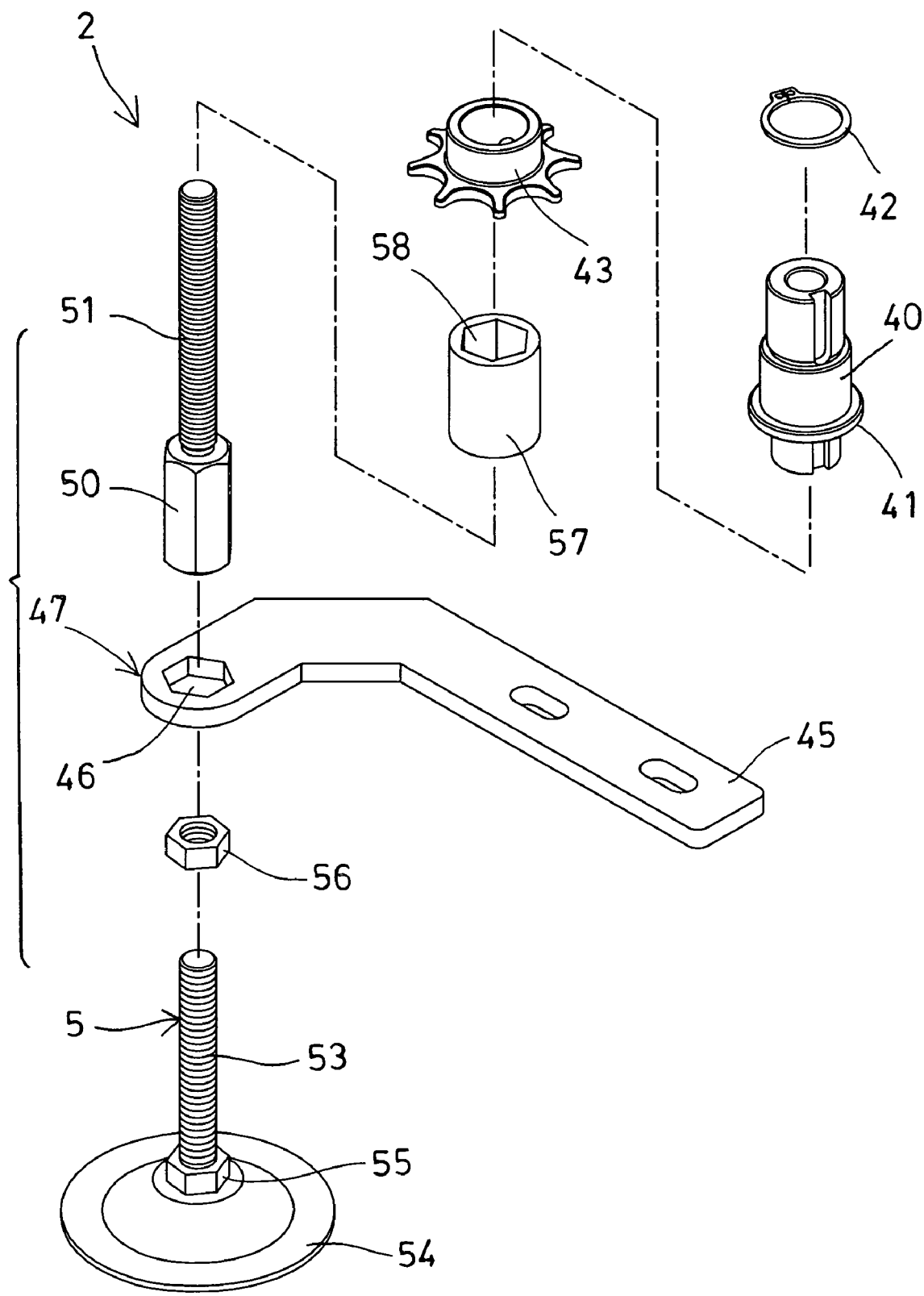
FIG. 5 is another partial exploded view the floor engaging device for the workbench.

A wheel device 30 includes four plates 31 secured to the bottom of the work table 10 and/or secured to the respective corner areas 23 of the peripheral frame 21 with such as latches or fasteners 32, and a bracket 33 rotatably attached or secured to each of the plates 31 with a pivot pin 34 (FIG. 4), and the bracket 33 is provided for rotatably attaching or mounting a wheel member 35 and arranged for allowing the bracket 33 and the wheel member 35 to be rotated freely relative to the plate 31 and the peripheral frame 21 of the base support 20 for 360 degrees with the pivot pin 34 and thus for allowing the base support 20 and the work table 10 to be easily and selectively moved everywhere with the wheel members 35 of the wheel devices 30 (FIGS. 3, 4).

Figure 6:
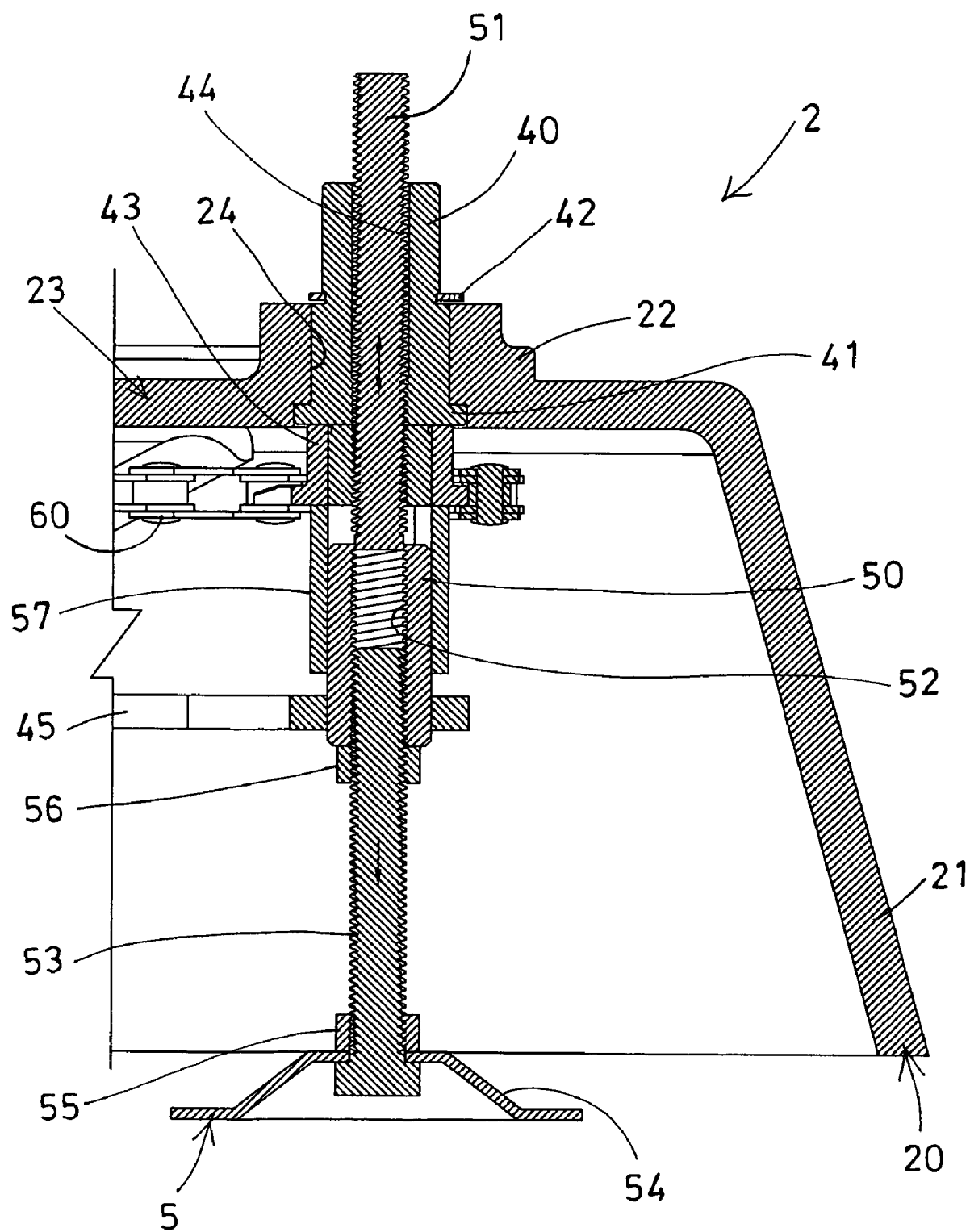
FIG. 6 is a further enlarged partial cross sectional view of the workbench.

As shown in FIGS. 1-3 and 5-8, four hubs or tubular members 40 are rotatably attached or engaged into the respective orifices 24 of the peripheral frame 21, and each include a peripheral rib 41 extended radially and outwardly therefrom (FIGS. 5, 6) for engaging with the bottom of the peripheral frame 21, and a retaining ring 42 is attached to each of the hubs or tubular members 40 and engaged with the upper portion of the peripheral frame 21 for rotatably attaching or mounting or securing the tubular members 40 to the respective corner areas 23 of the peripheral frame 21, and a sprocket or rotary member 43 is provided on each of the corner areas 23 of the peripheral frame 21 and keyed or secured to each of the tubular members 40 and rotated in concert with the tubular members 40 such that the sprockets or rotary members 43 may be rotatably attached or secured to the bottom of the work table 10. The tubular members 40 each include an inner thread 44 formed therein (FIG. 6).

Four arms 45 are secured to the bottom of the work table 10 and/or secured to the respective corner areas 23 of the peripheral frame 21 (FIGS. 1, 2) with such as latches or fasteners (not shown), and each include a non-circular opening 46 formed in a free end portion 47 thereof and aligned with the tubular member 40 respectively (FIG. 6) for attaching or mounting a floor engaging extremity 5. For example, the floor engaging extremities 5 are attached to the bottom and/or the corner areas of the work table 10 and each include a shank 50 having a non-circular outer structure for engaging with the non-circular opening 46 of each of the arms 45 and for allowing the shank 50 to be moved or slid up and down relative to the arms 45 and the tubular members 40 and the sprockets or rotary members 43.

The shanks 50 each include a bolt or threaded member 51 extended therefrom for threading or engaging with the inner thread 44 of the tubular members 40 respectively and thus for allowing the tubular members 40 and the shanks 50 to be moved or adjusted relative to each other, and each include an inner thread 52 formed therein (FIG. 6) for threading or engaging with another bolt or threaded stem 53 and for allowing the shanks 50 and the tubular members 40 to be moved or adjusted relative to the threaded stem 53, the threaded stems 53 each include a foot 54 attached or secured to the bottom thereof for stably engaging with the ground or the supporting surface, and each include a fastener or non-circular element 55 welded or secured to the threaded stem 53 and/or the foot 54 and rotated in concert with the threaded stem 53 and/or the foot 54 and for allowing the threaded stem 53 to be rotated relative to the shank 50.

Figure 9:
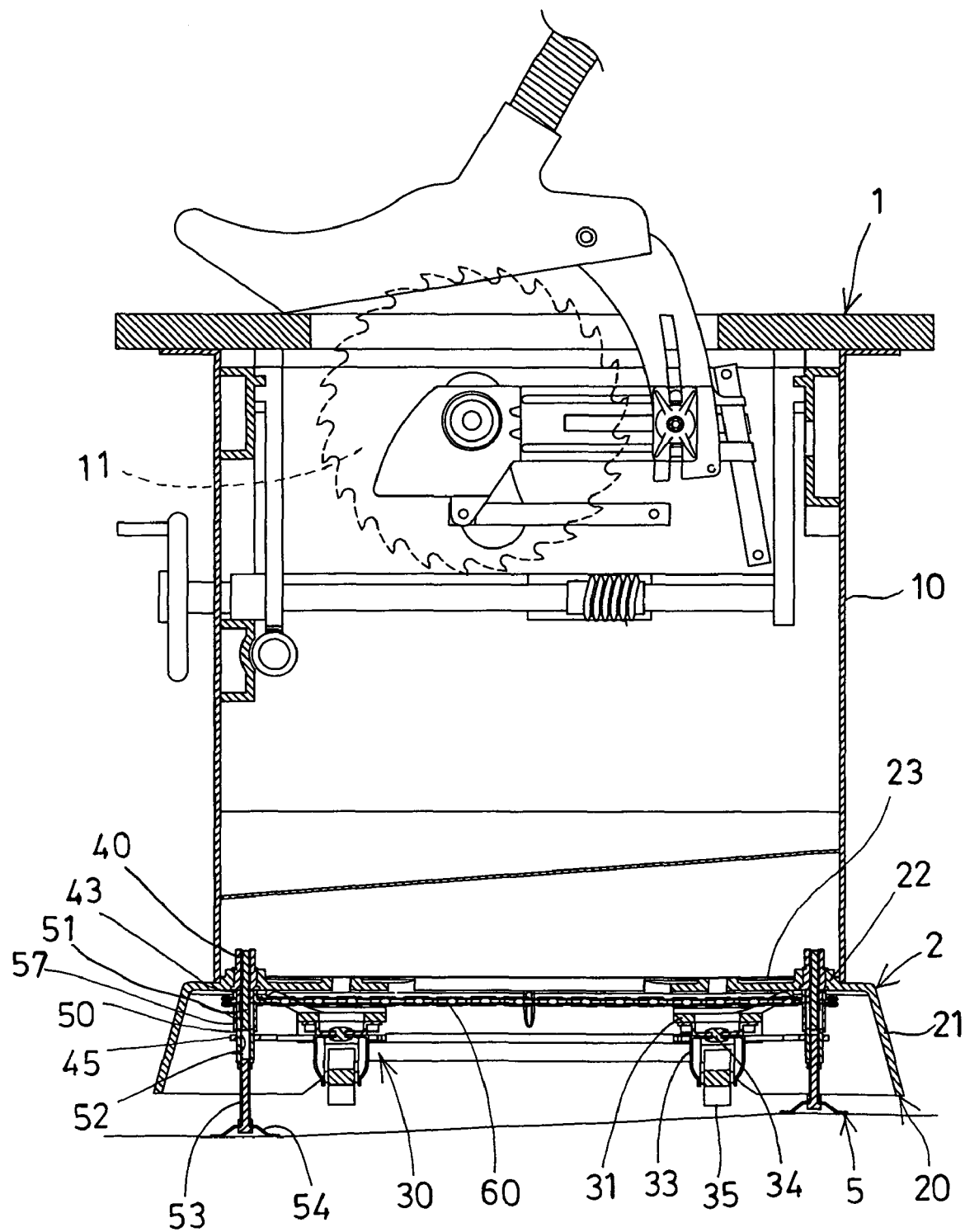
FIG. 9 is a further partial cross sectional view similar to FIGS. 3 and 8, illustrating the further operation of the workbench.

In operation, as shown in FIG. 9, the threaded stems 53 each may be rotated or micro-adjusted relative to the respective shank 50 for allowing the respective shank 50 to be moved or adjusted up and down relative to the threaded stem 53 and the foot 54 individually and thus for allowing the base support 20 and the work table 10 also to be moved or adjusted up and down relative to the threaded stem 53 and the foot 54 respectively. A lock nut 56 is engaged onto each of the threaded stems 53 for selectively engaging with the shank 50 (FIG. 6) and for selectively locking the threaded stem 53 to the shank 50 and for preventing the shank 50 from being further moved or adjusted up and down relative to the threaded stem 53 and the foot 54.

A coupling means or device 60, such as a coupling member or chain 60 is further provided and attached or engaged with the sprockets or rotary members 43 for rotating the sprockets or rotary members 43 simultaneously and for allowing the shanks 50 to be moved or slid up and down relative to the arms 45 and the tubular members 40 and the sprockets or rotary members 43 simultaneously with the coupling means or device 60 and thus for allowing the base support 20 and the work table 10 also to be moved or adjusted up and down relative to the threaded stems 53 and the feet 54 simultaneously, and thus for allowing the base support 20 and the work table 10 to be evenly moved or adjusted up and down relative to the threaded stems 53 and the feet 54 with the coupling means or device 60 and the sprockets or rotary members 43.

Figure 8:
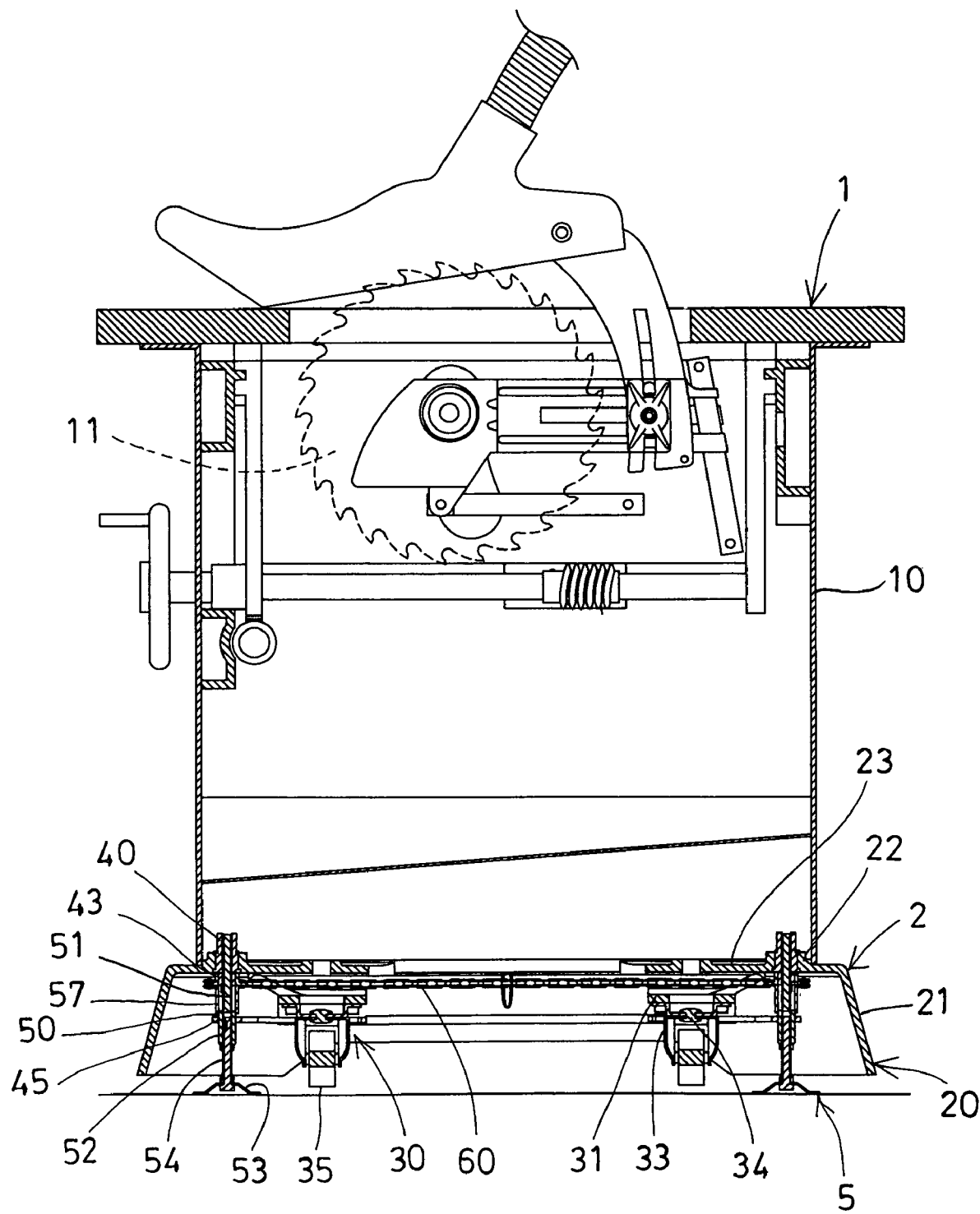
FIG. 8 is another partial cross sectional view similar to FIG. 3, illustrating the operation of the workbench.

In operation, as shown in FIGS. 7 and 8, when the sprockets or rotary members 43 and the tubular members 40 are rotated in one direction relative to the respective threaded members 51 and the respective shanks 50 simultaneously with the coupling means or device 60, the base support 20 and the work table 10 may be evenly moved or adjusted up and down relative to the threaded stems 53 and the feet 54 and the ground or the supporting surface, in order to suitably space or disengage the wheel members 35 of the wheel devices 30 from the ground or the supporting surface and to prevent the base support 20 and the work table 10 from being further moved to the other places or locations. As shown in FIGS. 1-3 and 5-8, a socket 57 may further be provided and attached or welded or secured to the bottom of each of the sprockets or rotary members 43 and may include a non-circular bore 58 formed therein for slidably engaging with the shank 50 and for preventing the shank 50 from being rotated or adjusted relative to the threaded stem 53 and the foot 54 inadvertently.

On the contrary, when it is required to move the work table 10 to the other places or locations, the sprockets or rotary members 43 and the tubular members 40 may be rotated in the other direction relative to the respective threaded members 51 and the respective shanks 50 simultaneously with the coupling means or device 60 in order to suitably space or disengage the feet 54 from the ground or the supporting surface and to engage the wheel members 35 of the wheel devices 30 with the ground or the supporting surface (FIG. 3), and thus to allow the work table 10 to be easily moved everywhere or to be moved to the selected or required positions or locations. It is to be noted that the base support 20 may be welded or secured or formed integral with the work table 10 such that the base support 20 may be taken as an integral part or integral portion of the work table 10.

As shown in FIGS. 1, 2, and 7, an operating means or device 7 is provided and includes a shaft 70 rotatably attached or secured to the lower hole or lower portion 12 of the work table 10, and includes a hand wheel 71 and a bevel gear or coupler 72 attached or secured to the shaft 70 and rotated in concert with the shaft 70, and includes another sprocket or rotary member 73 attached or secured to the bottom of the pivot axle 26 and engaged with the coupling device 60 and rotated in concert with the pivot axle 26, and another bevel gear or coupler 74 attached or secured to the upper portion of the pivot axle 26 and rotated in concert with the pivot axle 26 and engaged with the bevel gear or coupler 72 for allowing the sprocket or rotary member 73 and the coupling device 60 to be rotated or driven by the hand wheel 71 of the operating means or device 7 manually.

A further sprocket or rotary member 73 may be slidably or adjustably attached or secured to the base support 20 with a bracket 77 for selectively engaging with the coupling device 60 and for tensioning the coupling device 60 and for allowing the coupling device 60 to be suitably or effectively rotated or driven by the sprocket or rotary member 73 with the hand wheel 71 of the operating means or device 7 and thus for allowing the sprockets or rotary members 43 and the tubular members 40 to be rotated relative to the shanks 50 simultaneously and thus for allowing the shanks 50 to be moved or slid up and down relative to the tubular members 40 and the sprockets or rotary members 43 simultaneously and thus for allowing the base support 20 and the work table 10 also to be moved or adjusted up and down relative to the threaded stems 53 and the feet 54 simultaneously.

Accordingly, the workbench in accordance with the present invention includes a floor engaging device that may be easily and quickly adjusted or operated by the users for actuating or operating the wheels simultaneously and for quickly elevating and disengaging or separating the wheels from the ground or the supporting surface.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A workbench, comprising:
  a work table;
  a wheel device secured to a bottom of said work table for allowing said work table to be moved everywhere with said wheel device;
  four floor engaging extremities attached to the bottom of said work table;
  four rotary members rotatably attached to the bottom of said work table and engaged with said floor engaging extremities respectively for adjusting said work table up and down relative to said floor engaging extremities;
  means for coupling said rotary members together and for rotating said rotary members simultaneously and for adjusting said work table up and down relative to said floor engaging extremities simultaneously, wherein said coupling means includes a coupling member engaged with said rotary members for rotating said rotary members simultaneously and for adjusting said work table up and down relative to said floor engaging extremities simultaneously; and
  a base support disposed below said work table and for supporting said work table, wherein said rotary members are rotatably attached to said base support and said floor engaging extremities and said wheel device are attached to said base support, wherein said wheel device includes a plate secured to said base support, a bracket rotatably attached to said plate with a pivot pin, and a wheel member rotatably attached to said bracket.

2. A workbench, comprising:

a work table;

a wheel device secured to a bottom of said work table for allowing said work table to be moved everywhere with said wheel device;

four floor engaging extremities attached to the bottom of said work table;

four rotary members rotatably attached to the bottom of said work table and engaged with said floor engaging extremities respectively for adjusting said work table up and down relative to said floor engaging extremities;

means for coupling said rotary members together and for rotating said rotary members simultaneously and for adjusting said work table up and down relative to said floor engaging extremities simultaneously; and a base support disposed below said work table and for supporting said work table, wherein said rotary members are rotatably attached to said base support and said floor engaging extremities and said wheel device are attached to said base support, wherein four tubular members are rotatably attached to said base support and secured to said rotary members respectively, and said floor engaging extremities each include a threaded member threaded and engaged with said tubular members respectively for allowing said tubular members to be moved and adjusted up and down relative to said threaded members when said tubular members and said rotary members are rotated relative to said threaded members with said coupling means.

3. The workbench, as claimed in claim 2, wherein said floor engaging extremities each include a shank extended from said threaded member, and a threaded stem threaded and engaged with said shank for selectively adjusting said shank and said threaded member up and down relative to said threaded stem.

4. The workbench, as claimed in claim 3, wherein said floor engaging extremities each includes a foot attached to said threaded stem.

5. The workbench, as claimed in claim 3, wherein said floor engaging extremities each includes a non-circular element secured to said threaded stem for allowing said threaded stem to be rotated relative to said shank with said non-circular element.

6. The workbench, as claimed in claim 3, wherein said floor engaging extremities each includes a lock nut engaged onto each of said threaded stems for selectively engaging with said shank and for selectively locking said threaded stem to said shank and for preventing said shank from being adjusted up and down relative to said threaded stem.

7. The workbench, as claimed in claim 3, wherein said floor engaging extremities each includes an arm secured to said base support and having a non-circular opening formed in said arm, and said shank include a non-circular outer structure for engaging with said non-circular opening of said arm and for allowing said shank to be moved up and down relative to said arm.

8. The workbench, as claimed in claim 3, wherein said floor engaging extremities each includes a socket secured to said rotary member and having a non-circular bore formed therein for slidably engaging with said shank and for preventing said shank from being rotated and adjusted relative to said threaded stem inadvertently.

9. The workbench, as claimed in claim 1, further comprising means for operating said coupling member to rotate said rotary members simultaneously, wherein said operating means includes a second rotary member engaged with said coupling member, and a hand wheel coupled to said second rotary member for operating said second rotary member to rotate said coupling member and said rotary members.

10. The workbench, as claimed in claim 9, wherein said operating means includes a pivot axle secured to said second rotary member, a first coupler secured to said pivot axle, and a shaft rotatably attached to said work table and secured to said hand wheel, and a second coupler secured to said shaft and engaged with said first coupler for allowing said second rotary member to be operated with said hand wheel.

11. The workbench, as claimed in claim 10, further comprising a second rotary member engaged with said coupling member for tensioning said coupling member.

* * * * *